INVENTOR:
CYRUS C. DASH
JAMES G. HIGGINS
JOHN H. HERTNER
ATTORNEYS

Patented Jan. 19, 1937

2,068,399

UNITED STATES PATENT OFFICE 2,068,399

CONNECTER

Cyrus C. Dash, Lakewood, James G. Higgins, Cleveland, and John H. Hertner, Lakewood, Ohio, assignors to The Hertner Electric Company, Cleveland, Ohio, a corporation of Ohio Application February 20, 1932, Serial No. 594,158

7 Claims. (Cl. 173—328)

This invention relates to connecters for electrical conductors, and is especially adapted for use on electric vehicles to connect the various battery assemblies to the vehicle circuit, and as a means of connecting them to a charging source.

It is essential that the two parts of a connecter of this nature be easily and quickly connected and disconnected. It is also necessary that the contacting members in the connecter be rigidly held in engagement and that the contact between these members be not disturbed by the jarring of the vehicle.

It is desirable that the connecter be built in such a way that it is impossible to reverse polarities when the parts of the connecter are connected together, and it is desirable that the contact members be enclosed or shielded so that if either of the parts of the connecter is dropped, the contacts will not engage the floor which may be wet or which may be made of conducting material.

In some of the connecters heretofore employed, the parts have been bolted together as this permitted a positive contact under screw pressure. Wing nuts were usually employed on the bolts but these connecters were very difficult to replace or remove, and the operator frequently got the polarities reversed in connecting the parts together.

Another type of connecter which has been widely used is that which is known as the concentric plug type. Connecters of this type usually consist, both in the plug and receptacle, of molded composition containing concentric cylindrical contact surfaces, positive and negative, the whole being surrounded by a metallic shell. This type of connecter is not very satisfactory as both polarities do not contact firmly even though the members are pushed tightly together. When the plug is once in place, it is often difficult to withdraw it because of the friction between the contacting surfaces. A connecter for use on an electric vehicle is required to carry a very heavy current, with the result that it frequently becomes overheated, and this often leads to serious difficulties in a plug employing molded composition.

Another difficulty which has been present in the connecters described above has been the fact that it was possible to disconnect the plug and socket while they were under load. This caused arcing and resulted in burning of the contact members, making frequent replacement of these parts necessary.

One object of the present invention is to provide a connecter in which the main contacts are free of electrical load at the time they are brought together or separated.

Another object of the invention is to provide a connecter incorporating auxiliary contacts which control the circuit leading to the main contacts.

A further object of the present invention is to provide a connecter having main and auxiliary contacts which will engage and disengage in timed relation.

Another object of the present invention is to provide a plug and receptacle incorporating a plurality of auxiliary contacts.

A further object of the present invention is to provide a connecter having parts which can be quickly and easily connected and disconnected.

Another object of the invention is to provide a connecter in which the contacting members are held tightly in engagement in such a manner that the contact will not be weakened by jarring of the vehicle in which the device is mounted, and that the voltage drop and hence the heat loss at the contacting surfaces are minimized.

Another object of the invention is to provide a connecter in which it is impossible to connect the parts together so as to reverse polarities.

A further object of the present invention is to provide a connecter in which the contact members are shielded from accidental contact with the conducting surfaces.

A further object of the present invention is to provide a connecter in which the main contacts cannot be connected or disconnected while under load.

A further object of the present invention is to provide a connecter which is so constructed that there is no likelihood of overheating.

A further object of the present invention is to provide a connecting device in which the contact members can be easily replaced if necessary.

Other objects and features of novelty will be apparent from the following description taken in connection with the accompanying drawings, in which.

Figure 1:
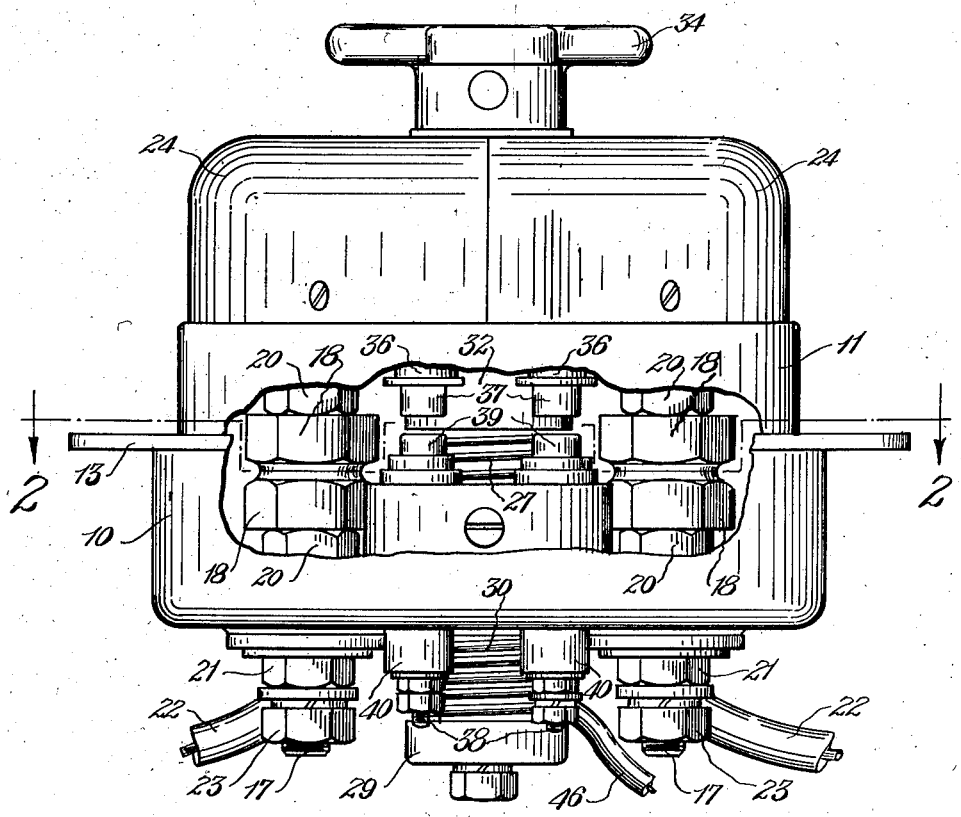
Fig. 1 is a side elevational view of a connecter embodying our invention, with parts broken away.

Referring to the drawings, it will be seen that the connecter embodying our invention comprises two separable portions, one of which, for convenience, may be termed the receptacle and which is adapted to be permanently secured to the vehicle, and the other of which is detachable from the first and, for convenience, may be called the plug. The receptacle or permanently mounted portion is designated generally by the reference character 10 and the detachable or plug portion by the reference character 11. The receptacle 10 includes a cup-shaped housing 12 with a marginal flange 13 by which it may be secured to the vehicle. The detachable or plug portion 11 has a cup-shaped housing 14, the peripheral portion or skirt of which is adapted to fit down into the recess of the housing 12, as clearly indicated in Figs. 3 and 4. The cup portions of the two housings 12 and 14 are somewhat elongated or oval-shaped and they are irregular in form so that it will be impossible for them to fit together except in one way, thus making it impossible to fit the parts together improperly and reverse polarities. The housing 12 has centrally of the base thereof an opening which is surrounded by the walls of a slight boss and an outwardly extending tubular flange 15. Directly opposite this opening the housing 14 of the plug 11 has centrally of its base a somewhat larger opening formed in an outwardly extending tubular flange 16.

The connecter herein illustrated has two pairs of main contact members, that is to say, each of the two main parts of the connecter has two main contact members which, when the two housings are fitted together as hereinbefore stated, engage the main contact members of the other part of the connecter. The connecter is so made as it is desirable that both halves of the circuit be made or broken by the connecter, although, as will be presently explained, the establishment of current flow does not occur immediately as the two parts of the connecter are fitted together and the ends of the two contact members brought into engagement with each other and the current flow is interrupted prior to the time when the parts of the connecter are separated. Additionally, the connecter has auxiliary contacts of which there may be either one pair, but preferably two pairs as herein illustrated, for purposes to be explained.

Figure 2:
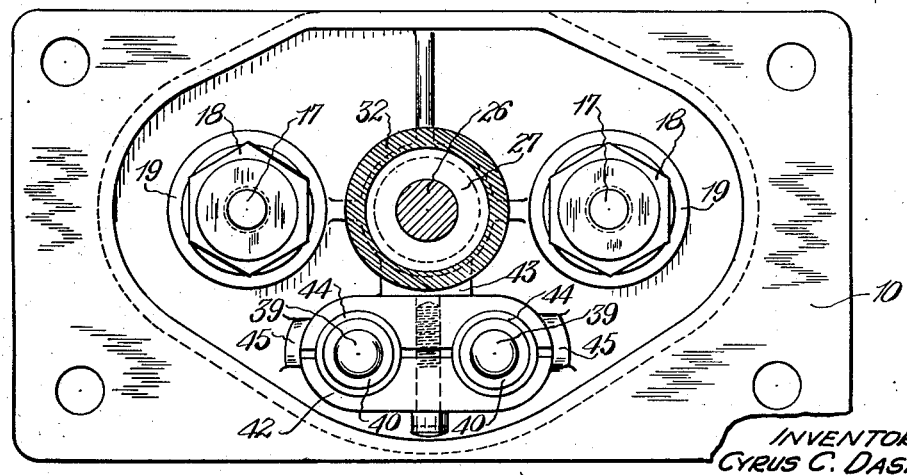
Fig. 2 is a sectional view taken along the line 2—2 of Fig. 1.
Figure 3:
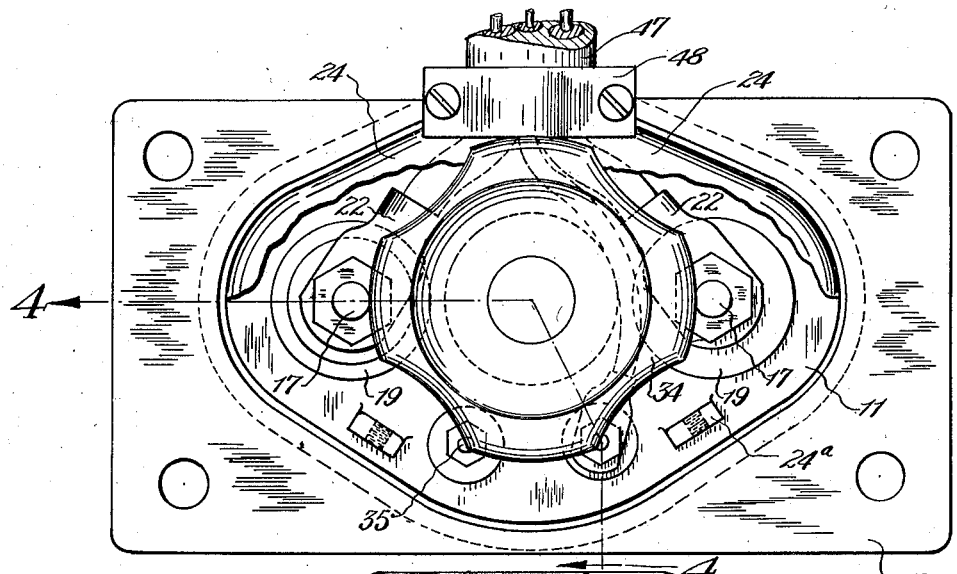
Fig. 3 is a top plan view of the connecter shown in Fig. 1 with a portion of the top cover broken away.
Figure 4:
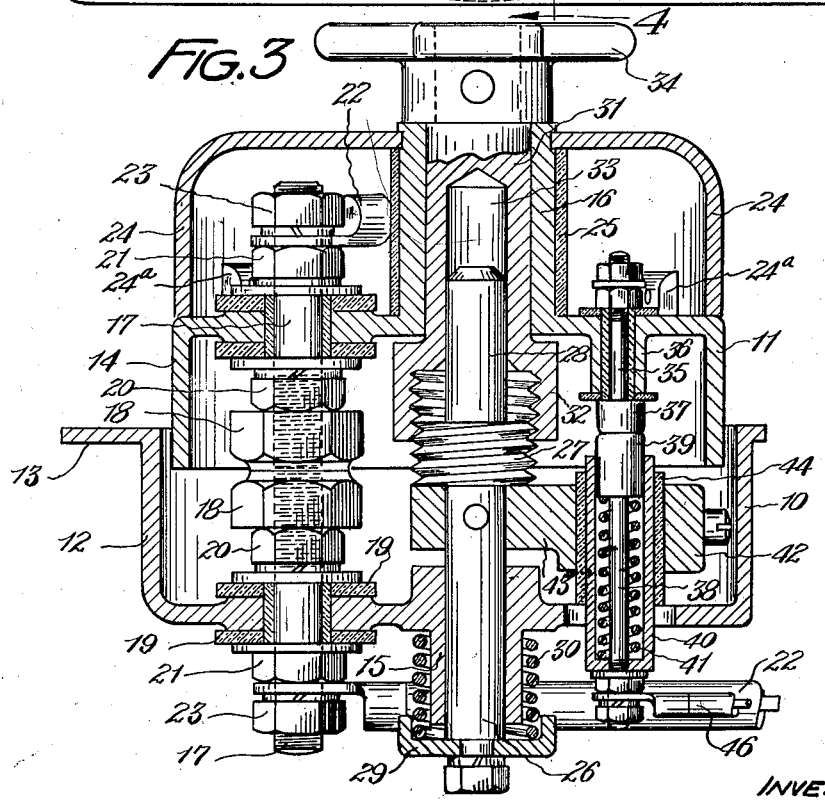
Fig. 4 is a sectional view taken along the line 4—4 of Fig. 3, with the parts shown in a slightly different relation than as shown in Fig. 1.

The main contact members of both halves or parts of the connecter are identical, these being located as indicated in Figs. 1, 2 and 3 on opposite sides of the tubular extensions 15 and 16 of the two parts of the housing, i. e., near opposite ends of the oval-shaped depressions in the housings. These main contact members, in this instance, consist of studs 17 preferably made from good conducting material, such as brass or copper, the studs extending through the base portions of the housings 12 and 14 and at their inner ends having removable, enlarged contacting portions 18 consisting, in this instance, of nuts formed also of good conducting material, such as mentioned above, secured onto the inner threaded ends of the studs 17. It will be understood that when the two housings are fitted together the contact members on one housing are directly opposite those on the other so that the large removable ends 18, whether in the form of nuts or otherwise, will engage each other end to end. The studs are insulated from the bases of the two housings by disks and bushings of suitable insulating material designated generally by the reference character 19, and they are held in place by inner and outer clamping nuts 20 and 21 which are screwed onto threaded portions of the studs. To the outer ends of the studs connecters 22 may be screwed, as by nuts 23.

To protect the exposed portions of the main and auxiliary contact members forming a part of the detachable unit 11 and to prevent exposed portions from coming in contact with the floor or other part should the unit be dropped, we prefer to cover and conceal the terminal portions by a removable housing member 24 which may be fitted onto the outer end of the tubular flange 16 (note Figs. 3 and 4) and may be held in place by screws extended through the walls of the housing member 24 into ears 24a or other suitable parts of the base of the housing member 14. For convenience in applying or removing the housing member 24, the latter may be formed in two parts. For additional protection against uninsulated portions of the conductors coming in contact with the tubular flange 16, the latter may be surrounded by an insulating sleeve 25 (see Fig. 4).

Before referring to the auxiliary contacts, it may be stated that the contacting faces of the two pairs of main contacts are adapted to be drawn together very tightly by screw pressure to reduce as much as possible the voltage drop and heat lost at the contacting faces. This is accomplished in a very satisfactory manner by two screw members which have an additional function of controlling the engagement and disengagement of the auxiliary contacts. For this purpose I employ two cooperating screw members, one of which, designated 26, is in the form of a non-rotating stud mounted in the tubular flange 15 and adjacent boss of the housing 12 and provided with an enlarged threaded portion 27 beyond which is an unthreaded pilot portion 28. This screw member 26 is held from rotation in the flange 15 and adjacent boss in a manner to be presently explained, but is permitted a limited endwise movement therein to an extent permitted by the normal distance (when the two parts of the connecter are separated) between the outer end of the tubular flange 15 and a cupped disk 29 which is mounted on the outer end of the screw member 26, there being arranged between this cupped disk and the base of the housing around the tubular flange 15 a rather stiff coil spring 30.

A companion screw member carried by the housing 14 is designated 31, this member having an enlarged inner end 32 which is internally threaded and adapted to receive the enlarged externally threaded end 27 of the screw member 26, and beyond the internally threaded end 32, the screw member 31 has a socket 33 which is adapted to receive the pilot 28 of the oppositely disposed screw member 26. The screw member 31 is rotatably mounted in the tubular flange 16 but is held from material endwise movement by reason of the shoulder formed by the enlargement 32 and by a second shoulder formed by the boss of a handwheel 34 which is fitted onto the outer end of the screw member 31 adjacent the outer end of the tubular sleeve 16. Obviously, when the two parts of the connecter are placed together to bring the several cooperating pairs of contacts in engagement, the pilot 28 enters the socket 33 and thus centers the two members or parts of the connecter so that the skirt of the housing 14 is readily fitted into the depression of the housing 12 and so as to permit the threaded portions of the two screw members to engage at the start of the tightening operation which is accomplished by turning the handwheel 34.

Taking up next the auxiliary contacts, in some instances a single pair of auxiliary contacts will answer the requirements. In other instances, two pairs of these contacts are desired, and the present connecter is shown as provided with two pairs. They are carried by the two housing members and project into the hollow space therein and are arranged at one side of the space within the housing members on opposite sides of the axis of the two screw members, as clearly indicated in Figs. 1, 2 and 3. As herein illustrated, the two contact members 35 which are carried by the housing 11 project through the base of the latter and are supported in inwardly projecting tubular flanges 36, being carefully insulated from the wall of the housing and from the flanges. These contact members as herein illustrated may consist of threaded studs of good conducting material with enlarged inner ends 37. The other auxiliary contact members which are adapted to cooperate with the contact members 35 are designated 38, these members being in the form of studs of good conducting material with enlarged inner ends 39 and each stud being endwise movable in a barrel 40 (see Fig. 4) which extends freely through an opening in the base of the housing member 12. In the barrel between the enlarged head 39 and the base of the barrel is a coil spring 41, which tends to urge the auxiliary contact member inwardly and to resist its outward movement. The two auxiliary contact members 38, with their associated barrels 40, are suitably carried by or movable with the screw member 26, and in this instance the barrels are held in a clamp 42, one part of which is on an arm 43 which is secured to the screw member 26 just outwardly of the enlarged threaded end 27 thereof, note particularly Fig. 4. Suitable sleeves 44 of insulating material insulate the barrels from the clamp. It will be observed that the arm 43 is fixed on the screw member 26 and the clamp 42, of which the arm 43 is a part, forms a convenient means by which the screw member 26 is held from turning, this being accomplished by providing on the base of the housing 12 a pair of upstanding ears 45 between which the clamp is fitted, as clearly shown in Fig. 2. To the outer ends of the studs or contact members 35 and 38 suitable conductors 46 are adapted to be secured, these conductors being much smaller than the conductors attached to the main contact members and the auxiliary contact members being much smaller than the main contact members since the current which traverses the conductors 46 and the auxiliary contact members attached thereto is relatively small.

Preferably the two main conductors and the relatively small conductors or connecters leading from the auxiliary contacts associated with the plug or removable part 11 of the connecter extend from the member 11 in the form of a well insulated cable 47, and in this instance a clamp 48 (Fig. 3) is provided on said housing to hold the cable and to prevent undue strain on the terminals of the individual conductors.

It might here be stated that one pair of the auxiliary contacts 35, 38 are utilized in the control of a circuit breaker in the main circuit. The conductors connected to these auxiliary contacts supply current to the coil of the circuit breaker which may be of the usual type wherein the breaker is closed magnetically and opened by a spring when the breaker coil is deenergized. When two pairs of circuit breaker contacts are employed, the second pair is generally utilized in the charging of the battery to supply a taper charge. When so used, the second pair of auxiliary contacts and the conductors connected thereto supply current to the coil of a small circuit breaker or contactor controlling a resistance which is adapted to be inserted in the charging circuit when the battery is nearly fully charged, the time of operation of the circuit breaker being controlled by an ampere hour meter which may be of the type which operates independently of line voltage and in which the field is produced by permanent magnets.

It is a feature of the present invention that when the two parts of the connecter are fitted together, the main contacts engage but the auxiliary contacts do not, the various parts being then approximately in the position shown in Fig. 1. At the same time, the pilot 28 enters into the guide socket 33 and the threaded portions of the screw members are in position for engagement with each other. When the handwheel 34 is turned, the screw member 26 is screwed into the screw member 31, but as the screw member 26 is held from rotation, the turning of the handle causes the screw member 26 to move axially into the housing, compressing coil spring 30 and bringing auxiliary contacts 38 toward the relatively stationary auxiliary contacts 35 since the contacts 38 are carried by the endwise movable, but non-rotatable screw member 26. Thus, as the handwheel is turned, the enlarged ends 39 of the auxiliary contacts 38 approach and finally engage the enlarged ends 37 of the auxiliary contacts 35. When this occurs, and not until it occurs, is the load thrown onto the main contacts for, upon the closure of the auxiliary contacts, the circuit breaker in the main circuit is closed, but when the circuit breaker is closed, the main contacts engage each other quite firmly, due to the pressure of the comparatively strong spring 30. The operator then continues to turn the handwheel, increasing the pressure between the main contacts and also the pressure between the auxiliary contacts, this further movement of the handwheel compressing the coil springs 41 associated with the auxiliary contacts 38, and this is continued until the cup-shaped disk 29 at the outer end of the screw member 26 engages the end of the boss or tubular flange 15 whereupon the final turning of the handle can be given, which pulls the main contacts together directly by the powerful screw action.

Likewise, when the operator wishes to disconnect the parts of the connecter, the handle is turned in the opposite direction, causing the screw members to be moved apart. This results first in a separation of the auxiliary contacts, which brings about the opening of the main circuit and also a gradual decrease of pressure between the main contacts, and the final separation of the main contacts, but it is to be noted that the main circuit is opened at the circuit breaker by the separation of the auxiliary contacts before the main contacts are separated and, in fact, while they are still held together under strong spring pressure.

A point to be noted is that not only is the flow of current across the main contacts started after the latter are in full engagement and interrupted while the latter are still in engagement, but, when the current flow is initiated or interrupted, the main contacts are very firmly pressed together by heavy spring pressure so that pitting of the main contacts is reduced to a minimum, but even if any pitting should occur, the contact ends are easily replaced. Very little arcing will occur at the auxiliary contacts for the reason that they carry a comparatively small load. Another important point to be noted is that though the contacts are under severe pressure when the parts of the connecter are fully engaged, nevertheless the contacts are established and broken very easily, this condition being quite the opposite of that which prevails when the contact is of a sliding nature rather than a face to face contact, as in this instance.

Thus it will be seen that the above and other objects enumerated at the beginning of the specification are attained very effectively with this construction, and while we have shown only one embodiment of our invention, it is obvious that changes may be made in details of construction and arrangement, and we aim in our claims to cover all modifications which do not involve a departure from the spirit and scope of the invention in its broadest aspects.

Having thus described our invention, we claim:

1. A connecter comprising two separable parts having main contacts and auxiliary contacts, a pair of threaded clamping members for causing clamping engagement between the cooperating contacts, and means for movably supporting one of said threaded clamping members, said movably supported member carrying one of the auxiliary contacts.

2. A connecter comprising two separable parts having main contacts which are adapted to engage each other when the parts of the connecter are placed together and being provided also with auxiliary contacts and a pair of cooperating clamping members, and means associated with one of the clamping members and one of the auxiliary contacts for bringing the auxiliary contacts into engagement and for increasing pressure between the main contacts and for separating the auxiliary contacts and relieving the pressure between and subsequently permitting the separation of the main contacts.

3. A connecter comprising two separable members with main contacts and auxiliary contacts, a pair of cooperating threaded clamping members, means mounting one of said clamping members for endwise movement, means associated with said last named member and carrying one of the auxiliary contacts, a spring associated with said endwise movable clamping member, said member and the auxiliary contact carried thereby being movable against the spring pressure when the two parts of the connecter are being placed in circuit-establishing position.

4. A connecter comprising two parts provided with pairs of rigidly mounted main contacts and pairs of auxiliary contacts, said parts also being provided with a pair of cooperating threaded clamping members, means associated with one of the parts whereby one of the clamping members is yieldingly mounted, and means associated with said last named clamping member and yieldingly supporting an auxiliary contact.

5. A connecter comprising a pair of housings each having main and auxiliary contacts adapted to engage corresponding contacts of the other housing, a pair of threaded clamping members each carried by one of the housings, a spring associated with one of the clamping members, means supporting said last named clamping member for endwise movement against the pressure of said spring, means associated with said last mentioned clamping member for supporting one of the auxiliary contact members for endwise movement, and a spring associated with said last mentioned contact member and acting to move the same in one direction whereby when the clamping members are operated the main contact members engage under pressure prior to the engagement of the auxiliary contact members and whereby on the operation of the clamping members in the reverse direction the pressure between the main contact members is reduced and the auxiliary contact members are separated before the separation of the main contact members.

6. A connecter comprising two separable parts having cooperating contact members and a pair of cooperating threaded clamping members, means for mounting one of said clamping members for rotary movement, and means for mounting the other of said clamping members for endwise movement relative to the part by which it is carried, certain of said contact members being carried by said last named clamp member.

7. A connecter comprising two separable parts having cooperating contact members and also having a pair of threaded cooperating clamping members, and means for yieldingly mounting one of said clamping members for endwise movement relative to the part by which it is carried, certain of said contact members being carried by said yieldably mounted clamping member.

CYRUS C. DASH.
JAMES G. HIGGINS.
JOHN H. HERTNER.